(12) United States Patent
Deng et al.

(10) Patent No.: US 12,043,197 B1
(45) Date of Patent: Jul. 23, 2024

(54) AIRBAG ASSEMBLY FOR LIFTGATE

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/180,895

(22) Filed: Mar. 9, 2023

(51) Int. Cl.
| | |
|---|---|
| *B60R 21/214* | (2011.01) |
| *B60J 5/10* | (2006.01) |
| *B60R 21/231* | (2011.01) |
| *B60R 21/233* | (2006.01) |

(52) U.S. Cl.
CPC .......... *B60R 21/214* (2013.01); *B60R 21/233* (2013.01); *B60J 5/102* (2013.01); *B60R 2021/23153* (2013.01); *B60R 2021/23308* (2013.01)

(58) Field of Classification Search
CPC .... B60R 2021/0072; B60R 2021/0083; B60R 2021/23153; B60R 2021/23161; B60R 2021/23192; B60R 2021/23308; B60R 21/213; B60R 21/214; B60R 21/232; B60R 21/233; B60J 5/102
See application file for complete search history.

(56) References Cited

U.S. PATENT DOCUMENTS

| | | | | |
|---|---|---|---|---|
| 6,113,132 | A * | 9/2000 | Saslecov | B60R 21/20 280/730.1 |
| 7,237,798 | B2 * | 7/2007 | Mori | B60R 21/26 280/743.1 |
| 7,290,798 | B2 * | 11/2007 | Mori | B60R 21/214 280/743.1 |
| 7,364,185 | B2 * | 4/2008 | Mori | B60R 21/214 280/749 |
| 7,461,858 | B2 | 12/2008 | Hirata | |
| 7,648,160 | B2 | 1/2010 | Mori et al. | |
| 7,878,530 | B2 * | 2/2011 | Mizuno | B60R 21/214 280/730.2 |

(Continued)

FOREIGN PATENT DOCUMENTS

| | | |
|---|---|---|
| DE | 102014213162 A1 | 1/2016 |
| JP | 2005041460 A | 2/2005 |

(Continued)

OTHER PUBLICATIONS

Non-Final Office Action for U.S. Appl. No. 18/324,218, filed May 26, 2023, as issued on Feb. 15, 2024.

*Primary Examiner* — Laura Freedman (74) *Attorney, Agent, or Firm* — Frank A. MacKenzie; Bejin Bieneman PLC (57) ABSTRACT

A vehicle includes a vehicle roof and a liftgate. The liftgate has a first end elongated along and adjacent to the vehicle roof and rotatably connected to the vehicle roof. The liftgate has a second end and a third end spaced from each other. The second end and the third end each extend from the first end away from the vehicle roof. An airbag is supported by the liftgate. The airbag includes a first segment and a second segment. The first segment is elongated along the first end and the second segment is elongated along the second end.

19 Claims, 6 Drawing Sheets

(56) References Cited

U.S. PATENT DOCUMENTS

| | | | |
|---|---|---|---|
| 7,909,357 B2 * | 3/2011 | Iida | B60R 21/233 |
| | | | 280/730.2 |
| 8,393,642 B2 * | 3/2013 | Nakaya | B60R 21/207 |
| | | | 297/216.12 |
| 8,419,051 B2 | 4/2013 | Kobayashi et al. | |
| 9,321,423 B2 | 4/2016 | Jaradi et al. | |
| 9,428,138 B2 * | 8/2016 | Farooq | B60R 21/216 |
| 11,104,291 B1 | 8/2021 | Dennis et al. | |
| 11,338,758 B2 * | 5/2022 | Park | B60R 21/232 |
| 11,529,927 B2 * | 12/2022 | Kwon | B60R 21/36 |
| 2006/0055153 A1 | 3/2006 | Hirata | |
| 2009/0212537 A1 | 8/2009 | Slaats et al. | |

FOREIGN PATENT DOCUMENTS

| | | | | |
|---|---|---|---|---|
| JP | 2006082731 A | * | 3/2006 | |
| JP | 2006088714 A | * | 4/2006 | |
| JP | 2006103660 A | * | 4/2006 | |
| JP | 2009078770 A | | 4/2009 | |
| JP | 2009241692 A | * | 10/2009 | |
| JP | 2011005912 A | * | 1/2011 | |
| JP | 2011005943 A | * | 1/2011 | |
| JP | 5151867 B2 | * | 2/2013 | B60R 21/232 |

* cited by examiner

AIRBAG ASSEMBLY FOR LIFTGATE

BACKGROUND

Vehicles are equipped with airbag assemblies that include an airbag and an inflator. In the event of certain vehicle impacts, the inflator activates and provides inflation medium to the airbag. This pressurizes the airbag to control the kinematics of an occupant during certain vehicle impacts. The airbag assemblies may be located at various positions in a passenger compartment of the vehicle. Vehicles may include airbags supported on a dash, side air curtains mounted to roof rails, seat-mounted airbag, etc.

DETAILED DESCRIPTION

A vehicle includes a vehicle roof. The vehicle includes a liftgate having a first end elongated along and adjacent to the vehicle roof and rotatably connected to the vehicle roof. The liftgate has a second end and a third end spaced from each other. The second end and the third end each extend from the first end away from the vehicle roof. An airbag is supported by the liftgate. The airbag includes a first segment and a second segment. The first segment is elongated along the first end. The second segment is elongated along the second end.

The airbag may include a third segment elongated along the third end of the liftgate. The first segment may have an inflation chamber. The second segment may have an inflation chamber open to the inflation chamber of the first segment. The third segment may have an inflation chamber open to the inflation chamber of the first segment.

The second segment may be elongated vehicle-rearward from the first segment. The vehicle may include a seat having a seatback. The seatback may be vehicle-rearward the first segment. The liftgate may be above the seat.

The vehicle may include a seat having a seatback. The second segment may be above the seatback when the second segment is in an inflated position. The seat may include a head restraint. The second segment may be adjacent the head restraint in the inflated position. The airbag may extend from the liftgate to a lowermost end of the airbag lower than the head restraint in the inflated position.

The vehicle may include an inflator supported by the liftgate.

The vehicle may include a body side. The second segment of the airbag may abut the body side in an inflated position. The vehicle may include a seat having a seatback. The second segment is above the seatback when the second segment is in an inflated position. The seat may include a head restraint. The second segment is between the head restraint and the body side in the inflated position.

A liftgate assembly includes a liftgate having a first end. A hinge on the first end of the liftgate. The liftgate has a second end and a third end spaced from each other and each extending away from the first end. An airbag is supported by the liftgate. The airbag has a first segment and a second segment. The first segment is elongated along the first end and the second segment is elongated along the second end.

The airbag may include a third segment elongated along the third end of the liftgate. The first segment may have an inflation chamber. The second segment may have an inflation chamber open to the inflation chamber of the first segment. The third segment may have an inflation chamber open to the inflation chamber of the first segment.

The liftgate assembly may include an inflator supported by the liftgate.

With reference to the Figures, wherein like numerals indicate like parts throughout the several views, a vehicle 10 includes a vehicle roof 12. The vehicle 10 includes a liftgate 14 having a first end 16 elongated along and adjacent to the vehicle roof 12 and rotatably connected to the vehicle roof 12. The liftgate 14 has a second end 18 and a third end 20 spaced from each other. The second end 18 and the third end 20 each extend from the first end 16 away from the vehicle roof 12. An airbag 22 is supported by the liftgate 14. The airbag 22 includes a first segment 24 and a second segment 26. The first segment 24 is elongated along the first end 16. The second segment 26 is elongated along the second end 18.

In the event of certain impacts to the vehicle 10, the airbag 22 inflates from an uninflated position to an inflated position to control the kinematics of an occupant. The support of the airbag 22 by the liftgate 14 allows for packaging of the airbag 22 to inflate to control the kinematics of the occupant. Specifically, the elongation of the first segment 24 of the airbag 22 along the first end 16 of the liftgate 14 and elongation of the second segment 26 of the airbag 22 along the second end 18 of the liftgate 14 allows the first segment 24 and the second segment 26 to inflate along the first end 16 and the second end 18 of the liftgate 14 to control the kinematics of the occupant during certain vehicle impacts. The support of the airbag 22 on the liftgate 14 allows for inflation along the first end 16 and the second end 18 of the liftgate 14 can accommodate for packaging constraints in other areas of the vehicle 10, e.g., the vehicle roof 12, a rear pillar 34, etc.

Figure 1:
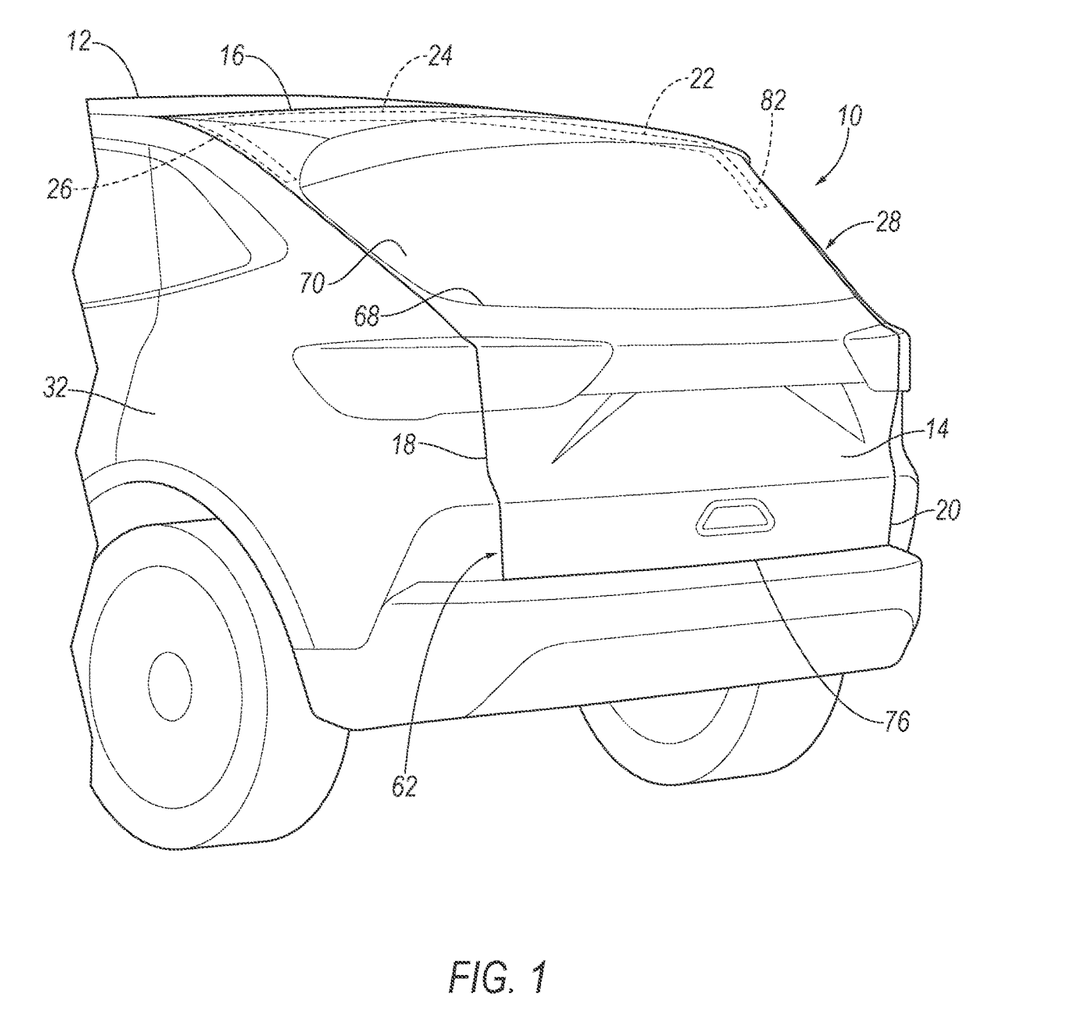
FIG. 1 is a perspective view of a rear of the vehicle with a liftgate in a closed position.

With reference to FIG. 1, the vehicle 10 may be any suitable type of automobile, e.g., a passenger or commercial automobile such as a sedan, a coupe, a truck, a sport utility, a crossover, a van, a minivan, a taxi, a bus, etc. The vehicle 10 can include a system or systems for autonomously or semi-autonomously operating the vehicle 10, e.g., an advanced driver assist system ADAS for speed control, lane-keeping, etc.

The vehicle 10 includes a vehicle body 28. The vehicle body 28 may be of a unibody construction, a body-on-frame construction, or any suitable construction. In the unibody construction, the vehicle body 28 serves as a frame, and the vehicle body 28 (includes the rockers, pillars 34, roof rails, etc.) is unitary, i.e., a continuous one-piece unit. As another example, in body-on-frame construction (also referred to as a cab-on-frame construction), the vehicle body 28 and frame are separate components, i.e., are modular, and the vehicle body 28 is supported on and affixed to the frame. In other examples, the vehicle body 28 may have any suitable construction. The vehicle body 28 may be of any suitable material, for example, steel, aluminum, etc.

The vehicle body 28 includes the vehicle roof 12, vehicle pillars 34, body panels, a vehicle floor 30, etc. The vehicle body 28 defines the passenger compartment 96 to house occupants, if any, of the vehicle 10. The passenger compartment 96 may extend across the vehicle 10, i.e., from one side to the other side of the vehicle 10. The passenger compartment 96 includes a front end and a rear end with the front end being in front of the rear end during forward movement of the vehicle 10.

With reference to FIG. 1, the vehicle 10 defines a vehicle-longitudinal axis L extending between a front end (not numbered) and a rear-end (not numbered) of the vehicle 10. The vehicle 10 defines a vehicle-lateral axis A extending cross-vehicle from one side to the other side of the vehicle 10. The vehicle 10 defines a vertical axis V extending through the vehicle floor 30 and the vehicle roof 12. The vehicle-longitudinal axis L, the vehicle-lateral axis A, and the vertical axis V are perpendicular relative to each other.

The vehicle roof 12 and the vehicle floor 30 are spaced from each other. Specifically, the vehicle floor 30 is spaced below the vehicle roof 12. The vehicle roof 12 defines the upper boundary of the passenger compartment 96 and may extend from the front end of the passenger compartment 96 to the rear end of the passenger compartment 96. The vehicle roof 12 may include roof rails (not numbered) and a roof panel (not numbered) extending from one roof rail to the other roof rail. The roof panel may be irremovably fixed to the roof rails. In other words, the roof panel is secured to the roof rails in such a way that removal requires destruction such as cutting, e.g., cutting material and/or welded joints, etc. As an example, the roof panel may be attached to both roof rails, e.g., by welding, fasteners, etc.

The vehicle floor 30 defines the lower boundary of the passenger compartment 96 and may extend from the front end of the passenger compartment 96 to the rear end of the passenger compartment 96. The vehicle floor 30 may include upholstery, for example, carpet, and may have a class-A surface facing the passenger compartment 96, i.e., a surface specifically manufactured to have a high quality, finished, aesthetic appearance free of blemishes.

With reference to the Figures, the vehicle body 28 includes a body side 32. Specifically, the vehicle body 28 includes two body sides 32 spaced cross vehicle 10 from each other. The body side 32 is a side of the body located vehicle-outboard of the passenger compartment 96. The body side 32 may be spaced cross-vehicle from the longitudinal axis L of the vehicle 10 and may be elongated along the longitudinal axis L. The body side 32 includes one or more door openings 60. The vehicle floor 30 extends from one body side 32 to the other body side 32 and the vehicle roof 12 extends from one body side 32 to the other body side 32.

The vehicle body 28, specifically each body side 32, may include pillars 34. In some examples, the pillars 34 on the same body side 32 are separated by one of the door openings 60. For example, the vehicle body 28 may include a front pillar 34 on each side of the vehicle 10. The front pillar 34 may extend between a windshield 36 and a front door 38 and other pillars 34 may be behind the front doors 38, e.g., between adjacent doors. The vehicle 10 may include any suitable number of pillars 34 on either body side 32. The pillars 34 may extend from the roof to the floor 30.

Figure 2:
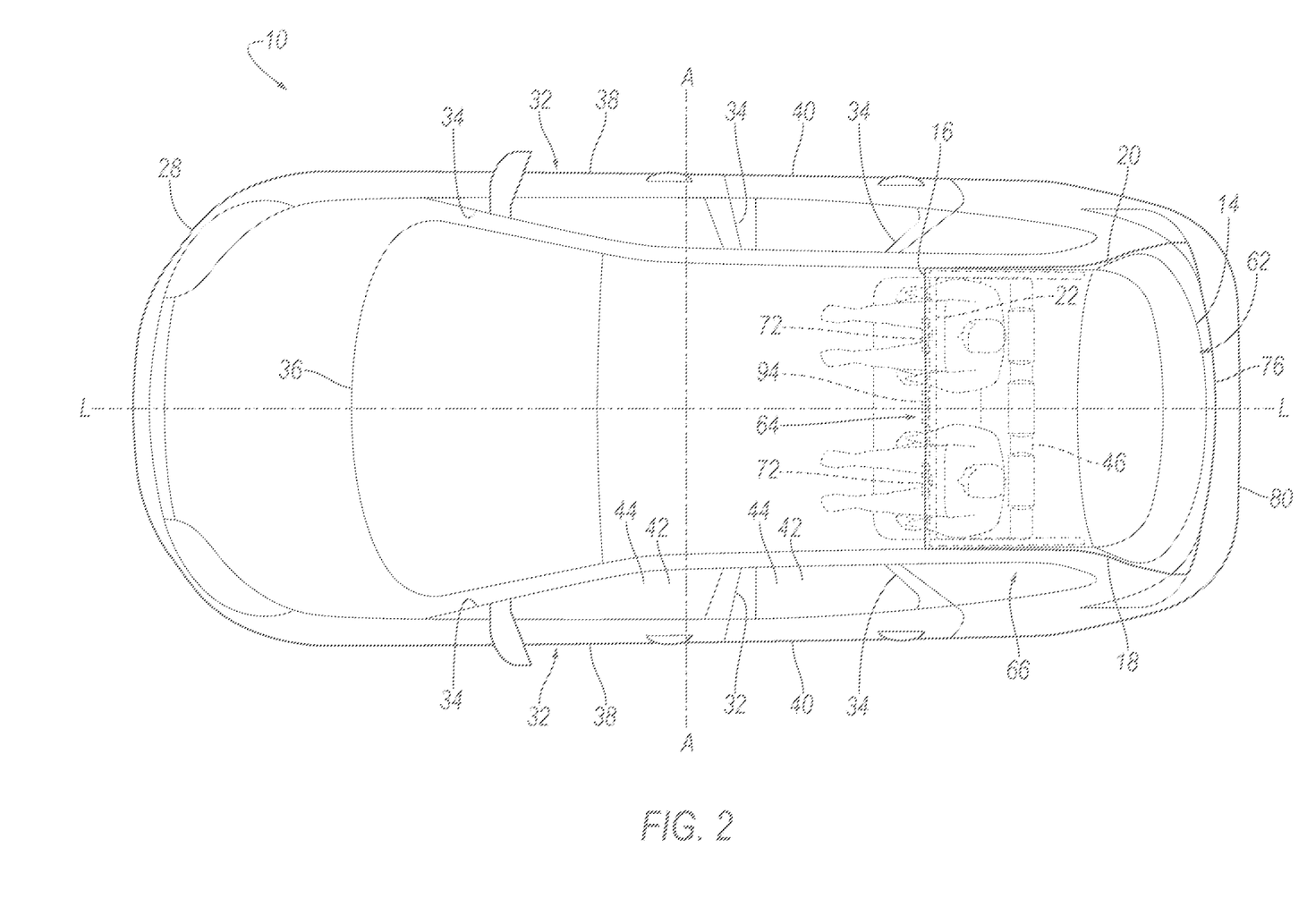
FIG. 2 is a top view of the vehicle with an airbag in an uninflated position.
Figure 3:
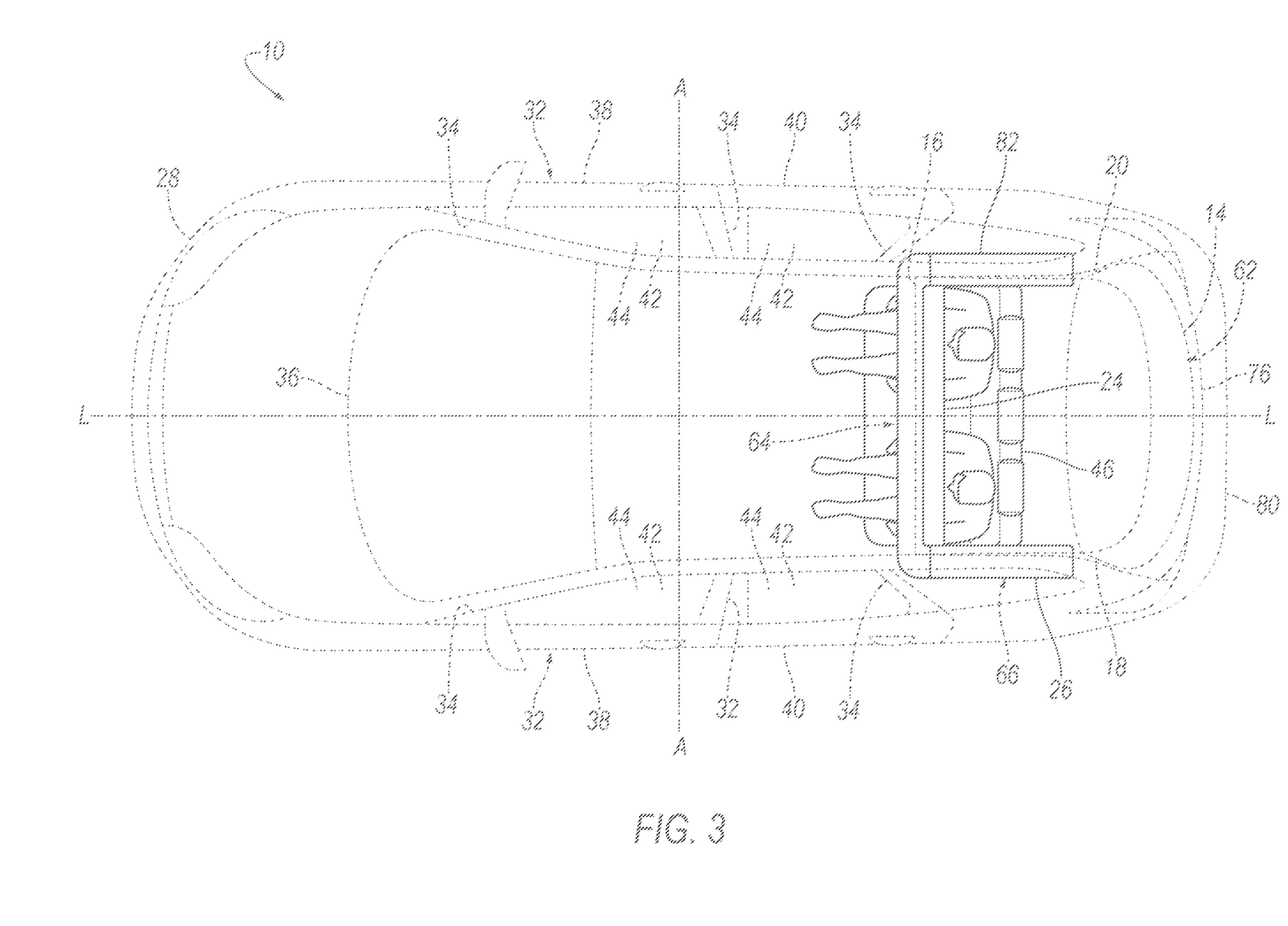
FIG. 3 is a top view of the vehicle with the airbag in an inflated position.

With reference to FIGS. 2 and 3, the vehicle 10 includes vehicle doors 38, 40 openable for occupants to enter and exit a passenger compartment 96. In the example shown in the Figures, the vehicle 10 includes a front door 38 and a rear door 40 on each body side 32. The front door 38 is vehicle-forward of the rear door 40 along the longitudinal axis L of the vehicle 10. Each door includes at least one door panel (not numbered) and the door-trim panel supported on the door panel. Specifically, the door may include two panels, namely a door inner (not numbered) and a door outer (not numbered). In such an example, the door-trim panel and the door outer are fixed to the door inner. The door-trim panel is positioned opposite the door outer. The door-trim panel is inboard relative to the door inner, and the door outer is outboard relative to the door inner. The door includes a window opening 42 that may be completely closed by a window 44 of the window 44 is in a fully raised position. The door outer faces outboard relative to the vehicle 10. The door outer may define a portion of the exterior of the vehicle 10. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.). The door inner may be metal (such as steel, aluminum, etc.) or polymeric (such as fiber reinforced plastic composite, etc.). The door inner provides structural rigidity for the door outer. The door inner may provide a mounting location for components of the door. The door-trim panel may include a covering. The covering may include upholstery, padding, etc. The upholstery may be cloth, leather, faux leather, or any other suitable material. The door-trim panel may be a material suitable for an interior of the vehicle 10, such as vinyl, plastic, leather, wood, etc.

Figure 4:
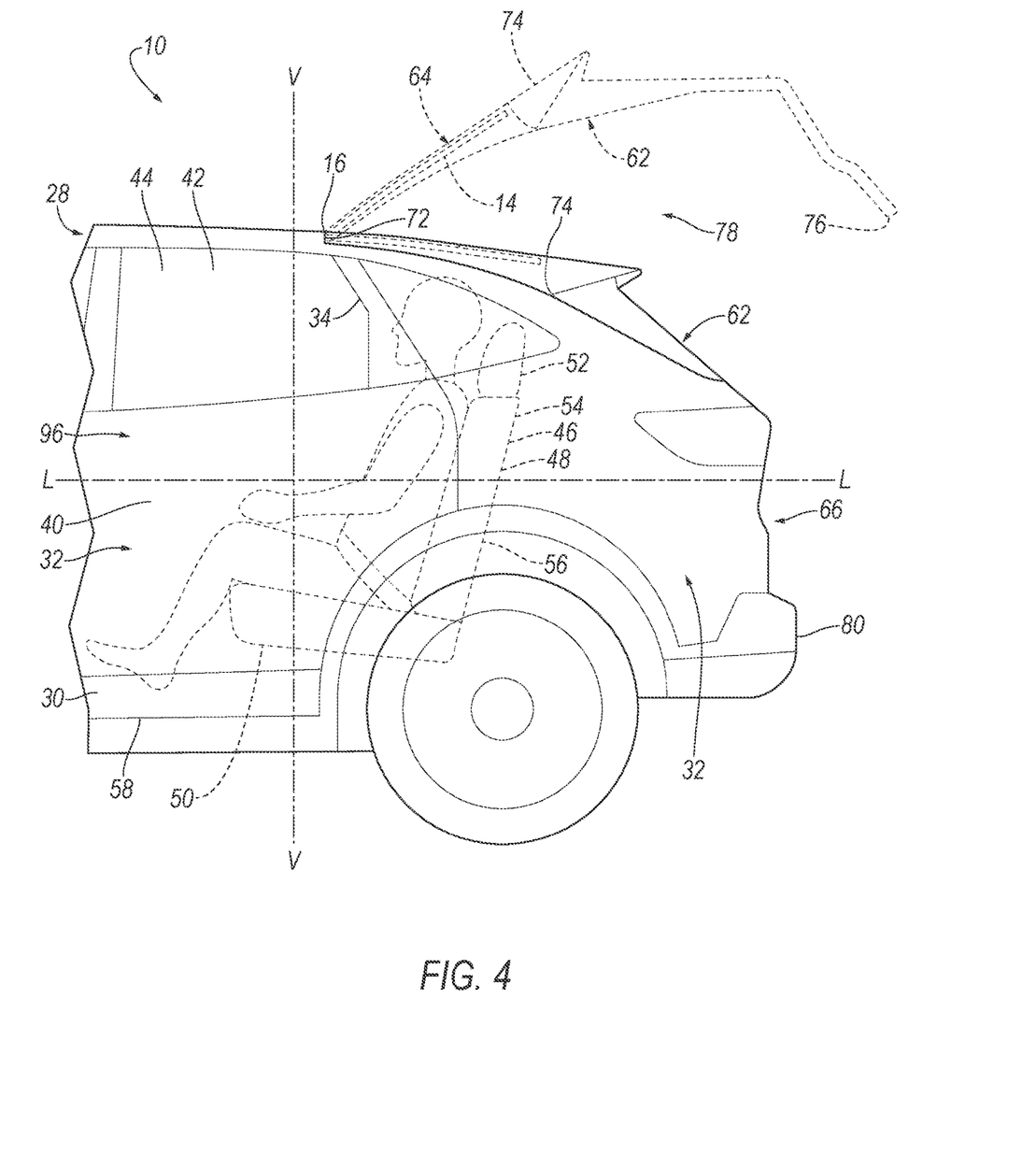
FIG. 4 is a side view of vehicle with the airbag in the uninflated position with the liftgate shown in an open position in broken lines.

With reference to FIGS. 2-4, the vehicle 10 may include one or more seats 46. Specifically, the vehicle 10 may include any suitable number of seats 46. The seats 46 are supported by the vehicle floor 30 (not numbered). The seats 46 may be arranged in any suitable arrangement in the passenger compartment 96. One or more of the seats 46 may be at the front end of the passenger compartment 96, e.g., a front row of seats 46. One or more of the seats 46 may be behind the front end of the passenger compartment 96, e.g., at the rear end of the passenger compartment 96 as a rear row of seats 46. In the example shown in the Figures, the vehicle 10 includes seats 46 is arranged as a rear row of seats 46. The rear row of seats 46 in the Figures may be, in some examples, a second row or a third row of seats 46. The seats 46 may be movable relative to the vehicle floor 30 to various positions, e.g., movable fore-and-aft and/or cross-vehicle. The seats 46 may be of any suitable type, e.g., a bucket seat 46, bench seat, etc.

Each of the seats 46 include a seatback 48, a seat bottom 50, and a head restraint 52. The head restraint 52 may be supported by and extends upwardly from the seatback 48. The head restraint 52 may be stationary or movable relative to the seatback 48. The seatback 48 may be supported by the seat bottom 50 and may be stationary or movable relative to the seat bottom 50. The seatback 48 may extend from an upper end 54 to a lower end 56. The lower end 56 may be connected to the seat bottom 50. The upper end 54 of the seatback 48 may be spaced upwardly from the lower end 56 of the seatback 48, i.e., upwardly from the seat bottom 50. The head restraint 52 may extend upwardly from the upper end 54 of the seatback 48. The seatback 48, the seat bottom 50, and the head restraint 52 may be adjustable in multiple degrees of freedom. Specifically, the seatback 48, the seat bottom 50, and the head restraint 52 may themselves be adjustable. In other words, adjustable components within the seatback 48, the seat bottom 50, and the head restraint 52 may be adjustable relative to each other.

The body side 32 includes the door opening 60. The door opening 60 may be between the pillars 34 and between a sill 58 and the roof. In the example shown in the Figures, the body side 32 includes a front door 38 opening and a rear door 40 opening adjacent the rear row of seats 46. The door opening 60 extends uninterrupted from one pillar 34 to another pillar 34. The door opening 60 extends uninterrupted from the vehicle floor 30 to the vehicle roof 12. The door opening 60 allows for ingress and egress into the passenger compartment 96. The vehicle 10 may include any suitable number of door openings 60 to allow for ingress and egress into the passenger compartment 96. For example, the vehicle 10 may include one door opening 60 on each side of the vehicle 10. In other examples, the vehicle 10 may include multiple door openings 60 on each body side 32 of the vehicle 10.

The vehicle 10 includes at least one liftgate assembly 62. The liftgate assembly 62 includes at least one liftgate 14 and at least one airbag assembly 64. The liftgate 14 may include the first end 16 supported by the vehicle roof 12. In the example shown in the Figures, the vehicle 10 includes one liftgate assembly 62.

The liftgate 14 is openable at a rear of the vehicle 66 to provide access to the passenger compartment 96, e.g., to a cargo area of the passenger compartment 96. The liftgate 14 is movable between an open position, shown in broken lines in FIG. 4, allowing access to the cargo area and a closed position, shown for example in FIG. 1, inhibiting access to the cargo area and enclosing the passenger compartment 96. The liftgate 14 may pivot between the open position and the closed position. The liftgate 14 may include a window opening 68 and a window 70 disposed in the window opening 68. A hinge 72 may connect the liftgate 14 to the vehicle roof 12, as described further below.

The liftgate 14 includes panels (not numbered), e.g., metal panels, and the hinge 72 is connected to one of the panels. The liftgate 14 may include one or more trim panels (not numbered) supported on the panels of the liftgate 14. The trim panels face the passenger compartment 96 when the liftgate 14 is in the closed position. The trim panels in such an example, the trim panels may include upholstery, padding, etc., including cloth, leather, faux leather, vinyl, plastic, leather, wood, etc.

The liftgate 14 includes the first end 16, the second end 18, the third end 20, and a fourth end 76. The liftgate 14 terminates at the first end 16, the second end 18, the third end 20, and the fourth end 76, i.e., the first end 16, second end 18, third end 20, and fourth end 76 define outer boundaries of the liftgate 14. The first end 16, second end 18, third end 20, and fourth end 76 are adjacent to the vehicle body 28 when the liftgate 14 is in the closed position. Specifically, the vehicle body 28 defines a liftgate opening 78 and the liftgate 14 is rotatable relative to the vehicle body 28 between the closed position and the open position. The vehicle roof 12, body sides 32, and/or a rear bumper 80 may define the liftgate opening 78. In the open position, the first end 16 of the liftgate 14 is adjacent the vehicle roof 12 and the fourth end 76 is spaced from the vehicle body 28.

Figure 5:
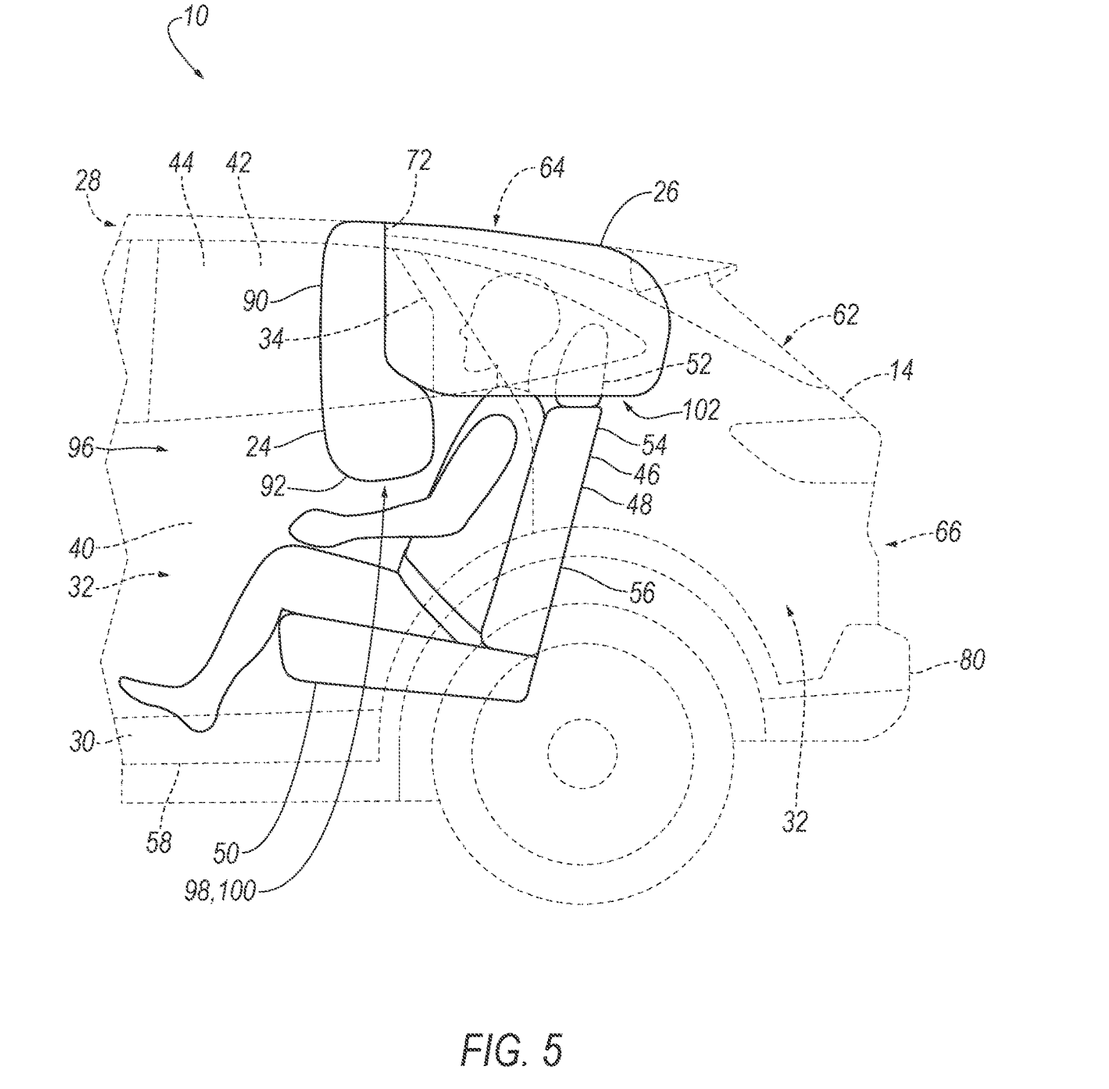
FIG. 5 is a side view of the vehicle with the airbag in the inflated position.
Figure 6:
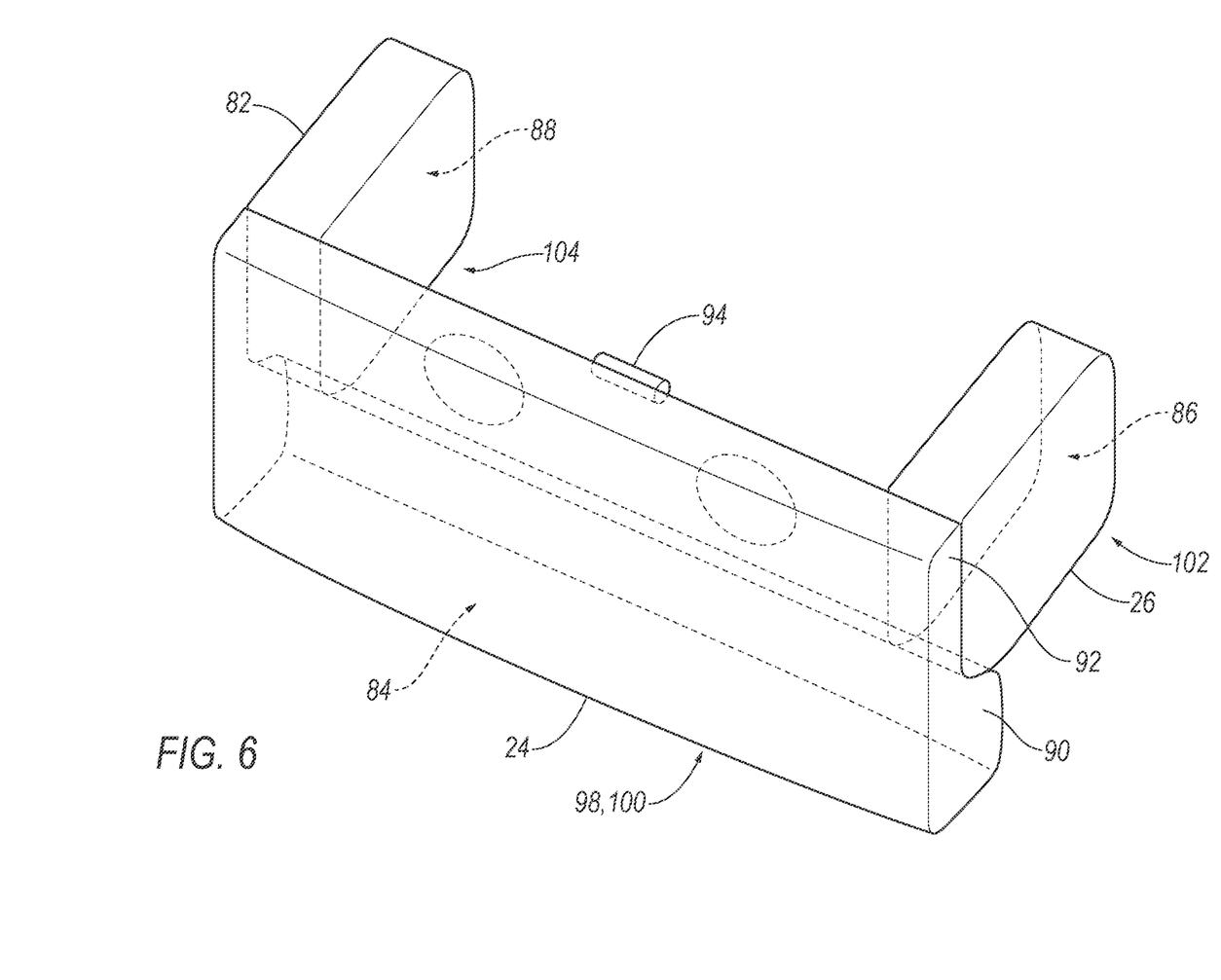
FIG. 6 is a perspective view of the airbag.

The first end 16 of the liftgate 14 is elongated along the vehicle roof 12. Specifically, the first end 16 of the liftgate 14 is elongated in the cross-vehicle direction between each body side 32. In the example shown in the Figures, the first end 16 is adjacent the vehicle roof 12. The second end 18 and the third end 20 are spaced from each other cross-vehicle. In the example shown in the Figures, the second end 18 and the third end 20 each extend from the first end 16 away from the vehicle roof 12. Specifically, the second end 18 and the third end 20 may be adjacent the body sides 32, respectively, when the liftgate 14 is in the closed position. The fourth end 76 is spaced from the first end 16 and the second end 18 and third end 20 extend from the first end 16 to the fourth end 76. The fourth end 76 is below the first end 16 when the liftgate 14 is in the closed position, as shown in FIGS. 4-5. The fourth end 76 may be adjacent the rear bumper 80 when the liftgate 14 is in the closed position.

As set forth above, the liftgate 14 is adjacent to the vehicle roof 12. Specifically, the liftgate 14 is connected to the vehicle roof 12, e.g., pivotably connected. For example, as set forth above, the hinge 72 connects the liftgate 14 to the vehicle roof 12. In the example shown in the Figures, the hinge 72 is between the liftgate 14 and the roof and pivotably connects the liftgate 14 and the vehicle roof 12. Specifically, the hinge 72 is on the first end 16 of the liftgate 14. Specifically, the hinge 72 pivotably connects the first end 16 of the liftgate 14 to the vehicle roof 12. The liftgate 14 pivots relative to the vehicle roof 12 from the closed position to the open position about the hinge 72.

The liftgate 14 is above the seat 46 in the closed position. In other words, a vertical line from the seat 46 extends through the liftgate 14 when the liftgate 14 is in the closed position. The liftgate 14 is above the head restraint 52 of the seat 46 in the closed position. As shown in the example, in the Figures, the liftgate 14 is above each of the seats 46, and more specifically the head restraint 52 of each of the seats 46, of the rear row.

As set forth above, the liftgate assembly 62 includes at least one airbag assembly 64. The airbag assembly 64 includes at least one inflator 94 that inflates the airbag 22 with inflation medium, as described further below. The airbag assembly 64 is inflatable to surround the occupant on the first end 16 of the liftgate 14, the second end 18 of the liftgate 14, and the third end 20 of the liftgate 14, as described further below.

The airbag 22 includes the first segment 24, the second segment 26, and may include a third segment 82. In the example shown in the Figures, the seatback 48 is vehicle-rearward the first segment 24. Specifically, the first segment 24 is elongated along the first end 16 of the liftgate 14, and the second segment 26 is elongated along the second end 18 of the liftgate 14. In examples including the third segment 82, the third segment 82 may be elongated along the third end 20 of the liftgate 14. In other words, the first segment 24 is elongated along the vehicle-lateral axis A, the second segment 26 is elongated vehicle-rearward from the first segment 24 along the vehicle-longitudinal axis L, and the third segment 82 is elongated vehicle-rearward from the first segment 24 along the vehicle-longitudinal axis L.

As discussed above, the airbag 22 is supported by the liftgate 14. As shown in the Figures, the airbag 22 is directly supported on the liftgate 14, i.e., the weight of the airbag 22 is borne directly by the liftgate 14 with no intermediate components. When the liftgate 14 is in the open position, the airbag 22 is in the uninflated position. The airbag 22 moves as a unit with the liftgate 14 as the liftgate 14 moves from the open position to the closed position. In the event of certain vehicle impacts, when the liftgate 14 is in the closed position, the airbag 22 may be inflated. In other words, the airbag 22 is inflatable to the inflated position when the liftgate 14 is in the closed position. The airbag 22, specifically, the first segment 24, the second segment 26, and/or the third segment 82, may be fixed to the liftgate 14 in any suitable fashion, e.g., with threaded fasteners, clips brackets etc. With reference to FIG. 2-4, the first segment 24 is supported on the first end 16 of the liftgate 14, the second segment 26 is supported on the second end 18 of the liftgate 14, and the third segment 82 is supported by the third end 20 of the liftgate 14. The first segment 24, second segment 26, and third segment 82 may be rolled or folded in the uninflated position, e.g., between the liftgate 14 and a trim panel, and extends downwardly from the liftgate 14 toward the floor 30 in the inflated position.

The airbag 22 may extend from the liftgate 14 to a lowermost end 98 of the airbag 22 lower than the head restraint 52 in the inflated position. In the example shown in the Figures, the first segment 24 has a lowermost end 100 and the lowermost end 98 of the airbag 22 is at the lowermost end 100 of the first segment 24. Specifically, a lowermost end 102 of the second segment 26 and a lowermost end 104 of the third segment 82 may be above the seatback 48 when the second segment 26 and the third segment 82 are each in the inflated position and the lowermost end 98 of the first segment 24 may be lower than the head restraint 52 when the first segment 24 is in the inflated position. In other words, the lowermost end 100 of the first segment 24 is lower than the lowermost end 102 of the second segment 26 and the lowermost end 104 of the third segment 82.

The second segment 26 is spaced from the third segment 82 along the vehicle-longitudinal axis L. The second segment 26 and the third segment 82 may each extend from the first end 16 of the liftgate 14 to the fourth end 76 of the liftgate 14. The second segment 26 may terminate at the fourth end 76 of the liftgate 14 and the third end 20 may terminate at the fourth end 76 of the liftgate 14. When the airbag 22 is in the inflated position, the second segment 26 may be adjacent the head restraint 52 in the inflated position and/or the third segment 82 may be adjacent the head restraint 52.

With reference to FIGS. 2-4, the second segment 26 may be between the head restraint 52 and the body side 32 in the inflated position and the third segment 82 may be between the head restraint 52 and the other body side 32 in the inflated position. Specifically, the second segment 26 of the airbag 22 may abut the body side 32 and the third segment 82 of the airbag 22 may abut the other body side 32 in the inflated position.

The second segment 26 and the third segment 82 may be inflated through the first segment 24. In other words, the inflator 94 may inflate the first segment 24 to the inflated position with inflation medium and the inflation medium flows through the first segment 24 to the second segment 26 and the third segment 82 to the inflated position. Specifically, the second segment 26 and the third segment 82 may share an inflation chamber 86, 88 with the first segment 24. For example, the first segment 24 may have an inflation chamber 84, and the second segment 26 and the third segment 82 each may have an inflation chamber 86, 88 open to the inflation chamber 84 of the first segment 24.

In the inflated position, the first segment 24 may include an upper portion 90 and a lower portion 92. The upper portion 90 and the lower portion 92 may share the inflation chamber 84. In the inflated position, the lower portion 92 is thicker than the upper portion 90 in a direction along the longitudinal axis L of the vehicle 10. In the inflated position, the second segment 26 and the third segment 82 extend vehicle-rearward from the upper portion 90 above the lower portion 92. In the inflated position, the first segment 24 of the airbag 22 may include detents configured to receive a head of an occupant during certain vehicle impacts.

As set forth above, the airbag assembly 64 includes the inflator 94. The inflator 94 is in fluid communication with the airbag 22. The inflator 94 expands the airbag 22 with inflation medium, such as a gas, to move the airbag 22 from the uninflated position to the inflated position.

The inflator 94 may be supported by the liftgate 14, i.e., the weight of the inflator 94 is borne by the liftgate 14. In such examples, the inflator 94 may be directly connected to the liftgate 14 or indirectly connected to the liftgate 14. For example, in examples including a housing (not numbered), the inflator 94 may be supported by the housing and the housing may be supported by the liftgate 14. In other examples, the inflator 94 may be supported by the vehicle roof 12, the pillar 34 of the vehicle 10, etc. The inflator 94 may be, for example, a pyrotechnic inflator 94 that ignites a chemical reaction to generate the inflation medium, a stored gas inflator 94 that releases (e.g., by a pyrotechnic valve) stored gas as the inflation medium, or a hybrid. The inflator 94 may be, for example, at least partially in the inflation chamber 84, 86, 88 to deliver inflation medium directly to the inflation chamber 84, 86, 88 or may be connected to the inflation chamber 84, 86, 88 through fill tubes, diffusers, etc.

The first segment 24, the second segment 26, and the third segment 82 may be fabric, e.g., a woven polymer. For example, the fabric may be woven nylon yarn, for example, nylon. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a vehicle roof;
   a liftgate having a first end elongated along and adjacent to the vehicle roof and rotatably connected to the vehicle roof, the liftgate having a second end and a third end spaced from each other and each extending from the first end away from the vehicle roof; and
   an airbag supported by the liftgate, the airbag having a first segment and a second segment, the first segment being elongated along the first end and the second segment being elongated along the second end;
   the second segment being elongated vehicle-rearward from the first segment.

2. The vehicle of claim 1, wherein the airbag includes a third segment elongated along the third end of the liftgate.

3. The vehicle of claim 2, wherein the first segment has an inflation chamber, the second segment has an inflation chamber open to the inflation chamber of the first segment, and the third segment has an inflation chamber open to the inflation chamber of the first segment.

4. The vehicle of claim 1, further comprising a seat having a seatback, the seatback being vehicle-rearward of the first segment.

5. The vehicle of claim 4, wherein the liftgate is above the seat.

6. The vehicle of claim 1, further comprising a seat having a seatback, the second segment is above the seatback when the second segment is in an inflated position.

7. The vehicle of claim 6, wherein the seat includes a head restraint, the second segment is adjacent the head restraint in the inflated position.

8. The vehicle of claim 7, wherein the airbag extends from the liftgate to a lowermost end of the airbag lower than the head restraint in the inflated position.

9. The vehicle of claim 1, further comprising an inflator supported by the liftgate.

10. The vehicle of claim 1, further including a body side, the second segment of the airbag abutting the body side in an inflated position.

11. The vehicle of claim 10, further comprising a seat having a seatback, the second segment is above the seatback when the second segment is in the inflated position.

12. The vehicle of claim 11, wherein the seat includes a head restraint, the second segment is between the head restraint and the body side in the inflated position.

13. A liftgate assembly comprising;
 a liftgate having a first end;
 a hinge on the first end of the liftgate;
 the liftgate having a second end and a third end spaced from each other and each extending away from the first end; and
 an airbag supported by the liftgate, the airbag having a first segment and a second segment, the first segment being elongated along the first end and the second segment being elongated along the second end;
 the second segment being elongated vehicle-rearward from the first segment when the liftgate is on a vehicle.

14. The assembly of claim 13, wherein the airbag includes a third segment elongated along the third end of the liftgate.

15. The assembly of claim 14, wherein the first segment has an inflation chamber, the second segment has an inflation chamber open to the inflation chamber of the first segment, and the third segment has an inflation chamber open to the inflation chamber of the first segment.

16. The assembly of claim 13, further comprising an inflator supported by the liftgate.

17. A vehicle comprising:
 a vehicle roof;
 a liftgate having a first end elongated along and adjacent to the vehicle roof and rotatably connected to the vehicle roof, the liftgate having a second end and a third end spaced from each other and each extending from the first end away from the vehicle roof;
 an airbag supported by the liftgate, the airbag having a first segment and a second segment, the first segment being elongated along the first end and the second segment being elongated along the second end; and
 a seat having a seatback, the seatback being vehicle-rearward of the first segment in an inflated position.

18. The vehicle of claim 17, wherein the liftgate is above the seat.

19. The vehicle of claim 17, wherein the airbag includes a third segment elongated along the third end of the liftgate.

* * * * *